(12) United States Patent
Jeffery et al.

(10) Patent No.: US 6,970,905 B2
(45) Date of Patent: Nov. 29, 2005

(54) POINT TO MULTI-POINT COMMUNICATIONS SYSTEM

(75) Inventors: Ross A. Jeffery, Uxbridge (CA); Marc C. Jairam, Scarborough (CA)

(73) Assignee: Techbanc Inc., Toronto (CA)

(*) Notice: Subject to any disclaimer, the term of this patent is extended or adjusted under 35 U.S.C. 154(b) by 729 days.

(21) Appl. No.: 09/875,192

(22) Filed: Jun. 7, 2001

(65) Prior Publication Data

US 2002/0188668 A1 Dec. 12, 2002

(30) Foreign Application Priority Data

Apr. 20, 2001 (CA) .............................................. 2344743

(51) Int. Cl.[7] .............................................. G06F 15/16
(52) U.S. Cl. ...................... 709/203; 709/208; 709/209; 709/227; 709/251; 709/252; 370/389; 370/401; 370/486; 379/93.05
(58) Field of Search ................................. 709/203, 208, 709/209, 227, 251, 252; 370/389, 401, 486; 379/93.05

(56) References Cited

U.S. PATENT DOCUMENTS

| | | | | |
|---|---|---|---|---|
| 6,678,721 B1 | * | 1/2004 | Bell | ........................... 709/209 |
| 6,778,646 B1 | * | 8/2004 | Sun | ........................... 379/93.05 |
| 2003/0035442 A1 | * | 2/2003 | Eng | ........................... 370/486 |
| 2004/0196857 A1 | * | 10/2004 | Holloway et al. | .......... 370/401 |

* cited by examiner

*Primary Examiner*—Ario Etienne
*Assistant Examiner*—Yves Dalencourt
(74) *Attorney, Agent, or Firm*—Dimock Stratton LLP; Mark B. Eisen (57) ABSTRACT

A point-to-multipoint communications network connecting multiple subscribers to a single communications line. A plurality of subscriber communications interfaces are connected in parallel to form a local group in which one communications interface serves as a master communications interface and the other communications interfaces serve as slaves. Each communications interface may be capable of serving as the master communications interface according to a demand division multiplexing technique, which assigns master status based on upstream data demands. As a communications interface is switched to master status, the communications interface previously holding master status is switched back to slave status. A plurality of communications interfaces can thus be connected to a single communications port without increasing the upstream transmission bandwidth requirements. Each network modem may communicate at a frequency separated from the frequencies of the other network modems, to substantially increase the bandwidth of the transmission medium.

30 Claims, 8 Drawing Sheets

POINT TO MULTI-POINT COMMUNICATIONS SYSTEM

FIELD OF INVENTION

This invention relates to communications. In particular, this invention relates to a communications system which allows for point-to-multipoint communications using twisted pair copper telephone wire or other suitable medium.

BACKGROUND OF THE INVENTION

High-speed data services such as Digital Subscriber Line ("DSL") service, and its variations such as ADSL, HDSL, SDSL, VDSL etc. (referred to herein collectively as "xDSL" or simply "DSL"), are becoming popular methods of communicating large volumes of data over standard twisted pair copper telephone wiring, for example for Internet data communications and World Wide Web browsing applications. DSL communications techniques have become common in many urban areas as an option for high-speed data service.

In a DSL communications service, a subscriber who pays for the DSL service is generally connected to a DSL network at a local telephone company central office. The DSL network exchanges data with the subscriber, in digital format, over the same twisted pair copper telephone wires which provide voice telephony service (commonly known as "plain old telephone service" or "POTS"), but at a frequency higher than the band reserved for analog service and with sufficient signal separation that there is optimally no interference between the DSL signals and analog telephony signals, so that both can be carried simultaneously. Typically the DSL service is constantly connected to the local telephone DSL distributor, while the POTS service is connected only when a telephone device is in use.

In an xDSL system each subscriber is served by a DSL port mounted on a compact (or other form factor) PCI line card. The line card is itself mounted in a rack which is fed by a large bandwidth communications carrier, typically an optical fiber, currently carrying data at rates of up to 200 Mbps. Each PCI card provides DSL chips comprising a modulator/demodulator, for example using DMT or QAM modulation (referred to herein as a "network modem"). Each DSL line card is currently provided with four network modems. Each network modem is dedicated to one communications port, to thereby serve four separate subscribers in point-to-point fashion, and is disposed in a rack containing 14 line cards. Thus, each rack is typically able to serve 56 subscribers.

Because each DSL port serves only a single subscriber this low DSL port density is very uneconomical, costing the telephone service in the order of thousands of dollars per subscriber, and as such making DSL service relatively unappealing to DSL service providers. Also, DSL racks occupy a significant amount of space, and the space available in a telephone company central office is limited. The lack of physical space available for adding new DSL racks limits the ability of the telephone company DSL service provider to expand its own customer base, and in some cases is used as a justification for excluding competition by other DSL service providers.

Moreover, the 200 Mbps data stream fed into the rack must be divided amongst all DSL subscribers, thereby limiting the DSL data output to less than 4 Mbps per port. Accordingly, despite the value to the subscriber of the DSL service, telephone companies have been slow to expand DSL services because the per subscriber cost makes it difficult to earn a return on their investment.

While it is possible to increase the DSL port density of each PCI card to some extent, and thereby decrease the per port cost of DSL installations to the telephone company, there remains the limitation that the rack input data stream must be divided amongst all subscriber ports, so the rack input data rate will ultimately limit the practical DSL port density of the rack. There is still much bandwidth available for downloads to subscribers, since DSL ports are currently operating at well below capacity; however, this bandwidth must be shared with upstream communications from the subscriber to the telephone company.

By far the most common DSL service, especially for consumer and small business service, is asymmetric DSL ("ADSL"). Unlike symmetric DSL (SDSL) and high bit-rate DSL (HDSL), which are symmetric diplex systems, ADSL is asymmetric because most of the diplex bandwidth is devoted to downstream communications (the term "downstream" as used herein meaning data communication from the DSL distributor to the subscriber), while only a small portion of bandwidth is made available for upstream data communications containing subscriber requests and uploads (the term "upstream" as used herein meaning data communication from the subscriber to the DSL distributor). This is a convenient method of managing DSL bandwidth, since upstream and downstream communications must share the available bandwidth and most Internet content contains graphics- and multi-media intensive-data which requires substantial downstream bandwidth, whereas subscriber requests and uploads have typically utilized much less data and thus required significantly lower upstream bandwidth. A typical ADSL communications system thus provides between 3 and 4 Mbps of downstream data and only 640 kbps of upstream data.

However, subscriber demands are changing. As digital photography, videoconferencing, e-commerce and other consumer/small business applications become more popular, upstream data demands are becoming significantly more data intensive, to the point that upstream bandwidth has become an important limitation on the capacity of DSL services. At the central office end, DSL service providers can connect multiple DSL subscribers to a high-speed backbone network using a Digital Subscriber Line Access Multiplexer (DSLAM), which multiplexes a plurality of data streams at high data rates while at the receiving end a DSLAM demultiplexes the signals and sends them to the individual destination subscriber modems. However, this does not address the data stream limitations of the so-called "last mile," between the DSL equipment and DSL subscribers, which remains a point-to-point communications system in which one line can serve only one subscriber modem. Thus, for a subscriber to implement multiple stations utilizing the DSL service requires expensive networking equipment.

There are two obstacles associated with increasing the number of subscriber modems per subscriber line. First, because the DSL line also carries analog voice telephony signals, it is not possible to directly couple the telephone lines of different subscribers. This would effectively turn the coupled subscribers' lines into a "party line". This problem can be overcome by bridging the separate subscriber lines through a spectrally differential bridging structure, for example the bridged data distribution network described in copending U.S. patent application Ser. No. 09/702,759 to Jeffery filed Nov. 1, 2000, which is incorporated herein by reference. This system couples the subscribers' lines only at frequencies above the analog telephony band. The coupling is invisible to the subscribers because low frequency POTS interconnection between subscriber lines remains blocked by filters, while communications at the coupled frequencies are packet-switched so each subscriber receives only packets intended for that subscriber.

The second obstacle is based on data management. Because upstream and downstream data transfers must share the same bandwidth, whatever bandwidth is used for uploads to the communications distribution rack is not available for downloads to subscribers. This precludes the provision of multiple subscriber modems on a subscriber line, even within the same subscriber premises, since there is no means for managing upload data from multiple subscriber modems on a single subscriber line. Thus, so-called "wide area network" communications systems such as DSL are currently constrained to a point-to-point communications architecture.

There is accordingly a need for a system and method for enabling point-to-multipoint communications in a network communications system, such as DSL, which allows a greater number of modems to share a single line connected to the DSL rack and thus to be connected to a single data port. This would not only substantially decrease the per-subscriber cost to the service provider, but would also effectively eliminate physical space constraints as a limitation on subscriber capacity.

SUMMARY OF THE INVENTION

The present invention overcomes these disadvantages by providing a point-to-multipoint communications in a wide area network communications system, which operates to manage data more efficiently so that multiple subscribers and/or subscriber modems can share the same communications line and can thus be connected to a single communications port at the telephone company distribution equipment.

The invention accomplishes this by providing a plurality of communications interfaces at the subscriber side of the network, either within a subscriber's premises or within multiple subscribers' premises, or both, which are connected in parallel to one communications port of a remote communications distributor to form a local group. According to the invention communications between the network modem at the distributor and the subscriber communications interfaces, and between subscriber communications interfaces, may take place over conventional twisted pair copper telephone wiring, although any other suitable transmission medium may also be used.

Within the local group of communications interfaces, at any particular point in time one communications interface serves as a master communications interface and the other communications interfaces serve as slaves. However, in the preferred embodiment each communications interface is capable of serving as either the master communications interface or a slave communications interface, according to a demand division multiplexing technique which assigns master status to a particular communications interface based on upstream data demands of that communications interface relative to the other communications interfaces in the local group. The communications interface mode may be switched dynamically as data upload demands require. As a communications interface is switched to master status, the communications interface previously holding master status in the local group is switched back to slave status, capable of receiving downloaded data from the communications distribution rack but capable of uploading data only to the current master communications interface.

Thus, at any point in time only one of the communications interfaces in the local group is switched to master status, and is capable of uploading data to the communications distributor, while all other communications interfaces in the local group are held in a slave status and are capable of receiving data downloads, but uploading data to the master communications interface only. In this fashion a plurality of communications interfaces can be connected to a single communications port at the communications distributor without requiring any increase in the bandwidth allocated to upstream transmissions, and a communications interface is assigned a master status priority only when upload demands from that communications interface require it.

In a preferred embodiment the communications interfaces may advantageously comprise DSL communications interfaces connected in a string, in parallel, to one DSL port of a DSL communications distributor at a telephone company central (or other) office. The service provider, such as a telephone company, has greater flexibility to optionally increase the download bandwidth to accommodate larger data transfer rates to the multiple DSL subscribers connected to each DSL port, because the upload bandwidth can remain static regardless of how many subscribers are utilizing the DSL service at any particular time.

According to the system and method of the invention, the number of subscribers connected to each DSL line, and therefore each DSL port at the distribution rack, can be increased from one to any number which can be supported by the download data transfer rate of each communications port, based on the download bandwidth limitations established by the telephone company, to thereby decrease the per subscriber cost of the DSL service by orders of magnitude.

The invention is advantageously employed in a DSL communications system by allowing shared DSL data ports, thereby reducing the per subscriber cost to the service provider and bringing the cost of providing DSL service down to a level which is attractive to both the DSL provider and service subscribers. The invention may be implemented in any DSL system, including dynamic communications systems such as rate-adaptive DSL (RADSL) systems which adapt download rates according to subscriber line capacities. However, the invention is not limited to DSL communications systems and has applications in other diplex communications systems.

The invention thus substantially reduces, or eliminates, limitations on subscriber capacity based on the port density of the communications distribution equipment. Since according to the invention many subscribers and subscriber-end modems can be connected to a single data line, the communications card can be provided with a single communications port serving the multiple subscribers and/or multiple modems within a single subscriber's premises. This also allows the communications card at the telephone company central office to support multiple network modems dedicated to the single communications port.

According to a further aspect of the invention, the multiple network modems can each be designed to communicate at a different frequency. This allows multiple separate QAM (or other desired modulation) carriers to be transmitted through the single port, to and from the multiple subscribers and/or multiple subscriber-end modems. With each network modem being adapted to transmit and receive a carrier at a frequency separated from the frequencies of the other network modems serving the same communications port, the DSL line becomes a multi-channel line and the bandwidth of the transmission medium between the DSL rack and the connected communications interfaces at the subscribers' premises is significantly increased for both upstream and downstream communications.

The multiple network modems may be carried on the same PCI card, or carried on different PCI cards and coupled through the backplane of the DSL rack.

Further, the multiple network modems coupled to a single communications port may be fixed-frequency or frequency agile, or a combination thereof. The allocation of frequencies as between frequency agile network modems can be controlled dynamically by a microprocessor integrated into the PCI card, or by a separate microprocessor coupled through contacts on the PCI card to pins controlling the modulation frequency of each network modem.

To selectively pass one or more carriers of the multi-channel signal to different subscriber modems, or to modems in different rooms sharing a single telephone line within a subscriber's premises, the invention provides a parallel bandpass filter bridge in which the output of the DSL port served by multiple network modems is coupled to each subscriber modem through a filter block. The filter block comprises one or more high pass and/or notch filters, which can be activated to pass only those frequencies which the respective subscriber is authorized to receive, to thereby block unauthorized access to selected channels of the multi-channel communications signal, and optionally a low pass filter to pass low frequency POTS (plain old telephone service) signals. This increases the types of communications protocols available for signal transmission because a subscriber line embodying the parallel bandpass filter bridge of the invention is not constrained to rely entirely on packet switching in order to route selected services to the appropriate subscriber modem, and can reduce opportunities for misappropriation of telecommunications services by blocking signals from specific subscriber modems.

The parallel filter bridge is capable of coupling all or some modems on a single line at specified frequencies corresponding to one or more channels of the DSL communications signal. In effect, the parallel filter bridge of the invention can be used to parse a single subscriber line into a plurality of subscriber lines, up to the number of channels in the multi-channel signal, each being isolated from the others by selective blocking of channels at the filter blocks. The filters blocks can provide any combination of fixed-frequency or frequency agile filters, and all frequency agile filters can be dynamically controlled to allocate a frequency most suitable for the signal required by each user, and/or to allocate separate frequencies for upstream communications from each user to the DSL rack.

In one preferred embodiment the system of the invention uses bit error rate (BER) testing to determine an optimal frequency allocation for each DSL chip. Frequency allocation may also, or alternatively, be based on any number of desired factors, including: signal sharing with other subscribers' signals; the data density of each subscriber's signal; interference from other sources; attenuation due to frequency band, cable length, cable type, cable idiosyncrasies, and/or impedance; signal-to-noise ratio; and such other factors as may be detected and processed by the microprocessor based on any desired logic, including selected weighting of factors and/or fuzzy logic.

The present invention thus provides, for a diplex communications network exchanging data packets with a plurality of subscriber stations, a communications interface for the subscriber stations comprising: a communications port for connection to the network, a modem having an address, coupled to the communications port, a processor coupled to the modem, for processing data packets having identifier information relating the data packets to the address, the processor further comprising a master communications interface mode in which the communications interface serves as a master communications interface for downloading data packets from the network and uploading data packets to the network, and a slave communications interface mode in which the communications interface serves as a slave communications interface for downloading data packets from the network and uploading data packets to the master communications interface, and a supplementary communications link, for communicating with one or more other communications interfaces, wherein when a plurality of communications interfaces are connected in parallel one of the plurality of communications interfaces is in master mode and the others of the plurality of communications interfaces are in slave mode, the communications interfaces switching between master mode and slave mode responsive to a priority queue of upload demands from the plurality of communications interfaces.

The present invention further provides a diplex communications network exchanging data packets with a plurality of subscriber stations, comprising a plurality of communications interfaces for the subscriber stations, at least some of the communications interfaces comprising: a communications port for connection to the network, a modem having an address, coupled to the communications port, a processor coupled to the modem, for processing data packets having identifier information relating the data packets to the address, the processor further comprising a master communications interface mode in which the communications interface serves as a master communications interface for downloading data packets from the network and uploading data packets to the network, and a slave communications interface mode in which the communications interface serves as a slave communications interface for downloading data packets from the network and uploading data packets to the master communications interface, and a supplementary communications link, for communicating with one or more other communications interfaces, wherein when a plurality of communications interfaces are connected in parallel one of the plurality of communications interfaces is in master mode and the others of the plurality of communications interfaces are in slave mode, the communications interfaces switching between master mode and slave mode responsive to a priority queue of upload demands from the plurality of communications interfaces.

In further aspects of the communications interface and diplex communications network of the invention: the communications interface comprises a buffer for storing data during switching intervals; the supplementary communications link comprises twisted pair telephone wiring within a premises; the communications interface remains in master mode to relay to the network an upload demand from another communications interface which is below a threshold size or data rate; the processor is remotely configurable; the supplementary communications link communicates using Ethernet; the supplementary communications link comprises an HPNA card; the modem is frequency agile; one or more of the others of the plurality of communications interfaces are fixed in slave mode; and/or when switching from master mode to slave mode the priority queue is transferred from the communications interface to another communications interface.

The present invention further provides a method of communicating over a diplex communications network exchanging data packets over a subscriber line with communications interfaces at a plurality of subscriber stations, comprising the steps of: a. for each communications interface, assigning an address to a modem coupled to a communications port of each communications interface, b. routing to each respective communications interface data packets downloaded from the network having identifier information relating the data packets to the address, c. in a master communications interface mode, uploading data packets to the network over the subscriber line, and d. in a slave communications interface mode, uploading data packets to a master communications interface over a supplementary communications link, wherein when a plurality of communications interfaces are connected in parallel one of the plurality of communications interfaces is in master mode and the others of the plurality of communications interfaces are in slave mode, the communications interfaces switching between master mode and slave mode responsive to a priority queue of upload demands from the plurality of communications interfaces.

In further aspects of the method of the invention: the method comprises the step of storing upload data during switching intervals; the supplementary communications link comprises twisted pair telephone wiring within a premises; a communications interface in master mode remains in master mode to relay to the network an upload demand from another communications interface which is below a threshold size or data rate; the method comprises the step of remotely configuring one or more communications interfaces; the supplementary communications link communicates using Ethernet; the supplementary communications link comprises an HPNA card; the modem is frequency agile, and including the step of changing a frequency of the modem responsive to subscriber line conditions; one or more of the others of the plurality of communications interfaces are fixed in slave mode; and/or the method includes the sub-step, when switching from master mode to slave mode, of transferring the priority queue from one communications interface to another communications interface.

The present invention further provides, for a diplex communications network exchanging data packets with a plurality of subscriber stations along subscriber transmission lines, a communications card comprising a plurality of modems, each modem for processing a carrier at a selected frequency separated from frequencies of other carriers generated by other modems in the communications card.

In further aspects of the communications card of the invention: the frequency of each modem is dynamically variable; the communications card comprises a processor for dynamically controlling the frequency of each modem based on conditions affecting its associated carrier; the signal processor analyzes momentary conditions of a subscriber transmission line and in response thereto assigns a frequency band for the modulated carrier associated with each modem; the momentary conditions of the subscriber transmission line are analyzed using bit error rate testing; the communications card comprises a test signal generator for generating test signals at different frequencies, wherein a bit error rate tester disposed at the subscriber station detects a bit error rate of the test signals at various frequencies; the communications card comprises a bit error rate tester for detecting a bit error rate of test signals generated at the subscriber stations; the modems are coupled to the same communications port, to thereby create a multi-channel subscriber line; the communications card comprises guardband filters for maintaining a frequency separation between carriers; the communications card comprises a routing device for coupling at least some of the modems to different communications ports; the routing device comprises a plurality of notch filters for passing a carrier generated by one modem and blocking carriers generated by other modems; and/or the communications card comprises guardband filters for maintaining a frequency separation between carriers, wherein the guardband filters are frequency agile and are controlled by the processor to change frequencies as the frequencies of carriers generated by the modems are changed.

The present invention further provides, for a communications card comprising a plurality of modems in a diplex communications network exchanging data packets with a plurality of subscriber stations along subscriber transmission lines, each modem processing a carrier at a selected frequency separated from frequencies of other carriers generated by other modems in the communications card, a routing device for coupling at least some of the modems to different communications ports, the routing device comprising a plurality of notch filters for passing a carrier generated by one modem and blocking carriers generated by other modems, and a processor for setting a passband frequency of each filter corresponding to the frequency of a selected carrier for coupling to a particular port.

In further aspects of the routing device of the invention: the modems are frequency agile and the processor dynamically controls a frequency of the carrier generated by each modem; and/or the processor dynamically changes a passband frequency of the notch filter corresponding to a selected frequency of the carrier generated by each modem for coupling each carrier to a particular port.

BRIEF DESCRIPTION OF THE DRAWINGS

In drawings which illustrate by way of example only a preferred embodiment of the invention.

DETAILED DESCRIPTION OF THE INVENTION

Figure 1:
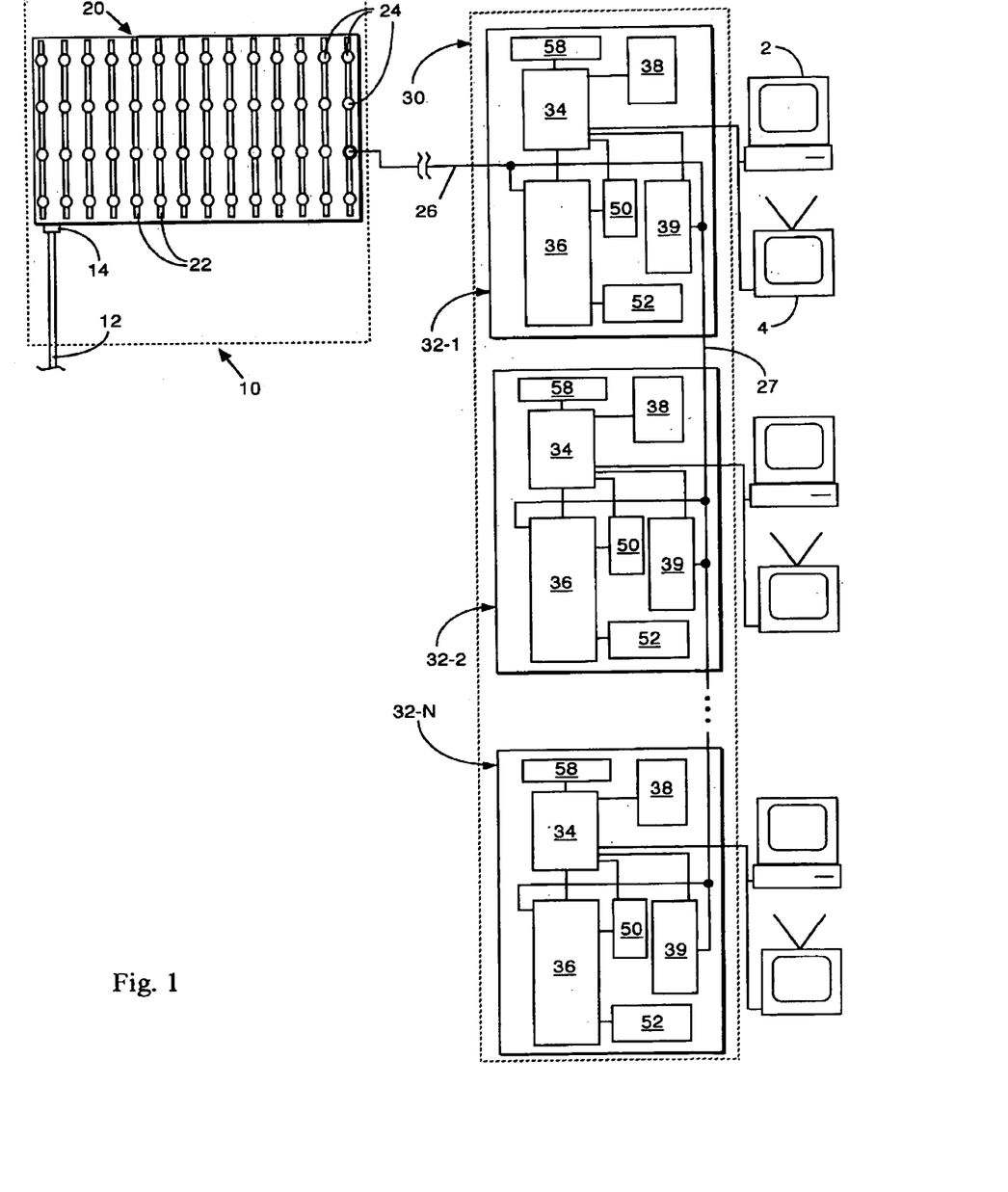
FIG. 1 is a schematic diagram illustrating the system of the invention.

The system of the invention is illustrated in FIG. 1. The invention will be described in relation to a DSL communications system by way of example, however the invention is not intended to be limited to DSL communications and is applicable to other diplex communications systems.

A local telephone company central office 10 is equipped with DSL distribution equipment comprising a plurality of DSL racks 20, each containing a plurality of PCI cards 22 each supporting a plurality of DSL communications ports 24. A typical DSL rack 20 is provided with a communications input 12 coupled to a communications cable or fiber 14 supporting digital data transfer, for example at 200 Mbps. Each DSL port 24 is coupled to suitable communications circuitry (not shown) which is well known in the art, to allow digital data transfer at a rate set by the telephone company, for example 300 kbps. The digital data ports 24 are in turn coupled to subscribers through existing telephone cable, typically twisted pair copper telephone wire 26, however this can be any other suitable medium including other types of electrical cable or, with the provision of suitable optical interfaces, optical fiber.

FIG. 1 illustrates the connection of a single DSL port 24 to a plurality of subscriber communications interfaces 32. The communications interfaces 32 may for example be disposed in different rooms within a single subscriber's premises, or under certain conditions within multiple subscribers' premises (for example neighbouring homes, neighbouring units in a commercial complex, neighbouring suites in a multiple-unit residential or commercial building etc.), or a combination both intra- and inter-premises.

The communications interfaces 32 are connected in parallel through subscriber line 26 to the DSL port 24 of the remote telephone company DSL distributor, in a string which thus forms a local group 30 of communications interfaces 32-1, 32-2 . . . 32-N as shown in FIG. 1.

Figure 1A:
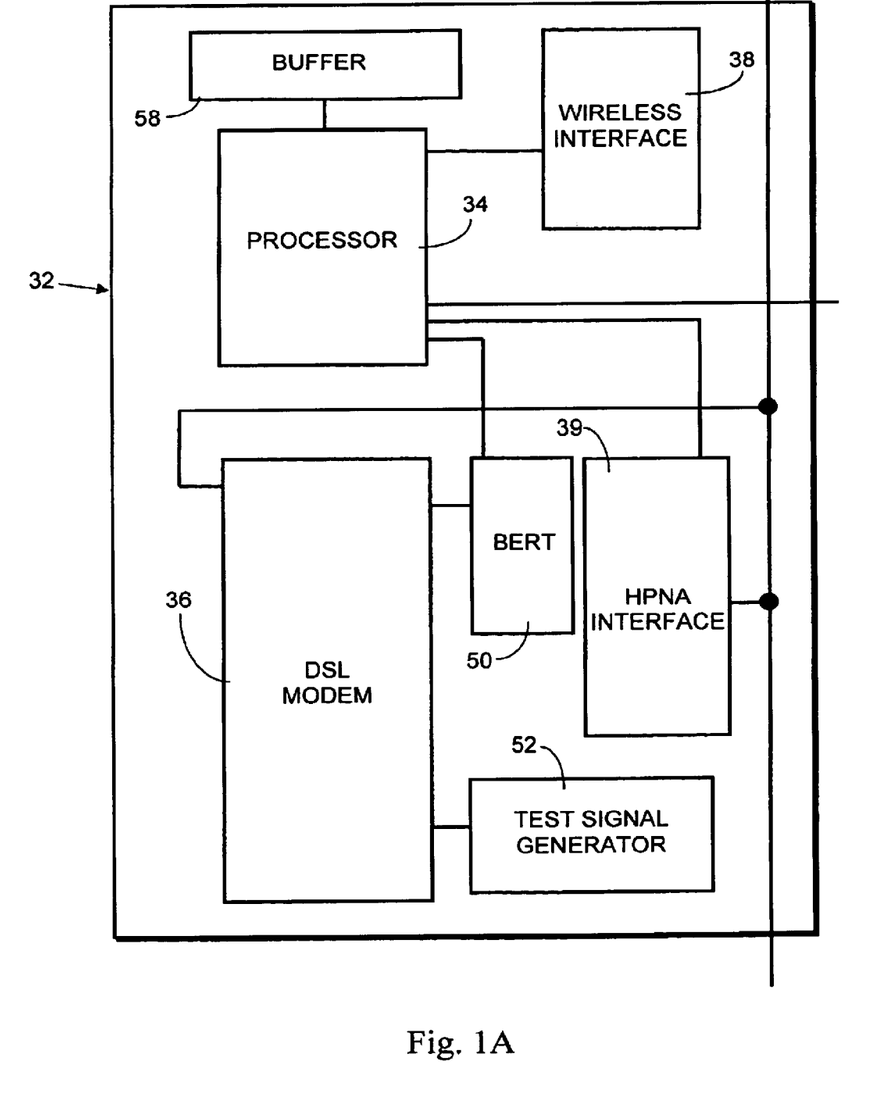
FIG. 1A is a schematic view of a communications interface in the system of FIG. 1.

Each communications interface 32 comprises a processor 34 which generates (or is assigned by other network elements) a unique address, for example an IP address. In addition to the master/slave switching functions described below, the processor 34 identifies, assembles and processes data packets received from the network headed with the processor's IP address, and/or data packets received from the network headed with one or more IP addresses associated with any processing device (e.g. a computer 2) connected to the communications interface 32, and creates packets of data uploaded from each interactive processing device, for example a computer 2. Each communications interface 32 also comprises a DSL modem 36, and preferably comprises a digital-to-analog converter which allows for connection to analog equipment such as telephone devices, and a BlueTooth (Trademark) or like device 38 allowing for wireless connection to the computer 2 and/or other interactive communications devices, and optionally a television 4.

The processor 34 renders each communications interface 32 capable of operating in two modes: a master communications interface mode M, in which the communications interface 32 can both download data from and upload data to the DSL rack 20; and a slave communications interface mode S, in which the communications interface 32 can download data from the DSL rack 20 but uploads data to the master communications interface M, as described in greater detail below.

Although in the preferred embodiment each communications interface 32 of the plurality of communications interfaces 32 in the local group 30 may be capable of operating in either the master mode or the slave mode, at any particular point in time only one communications interface 32 is in the master mode to serve as a master communications interface M, and all other communications interfaces 32 in the local group 30 are in the slave mode to serve as slave communications interfaces S.

Figure 2:
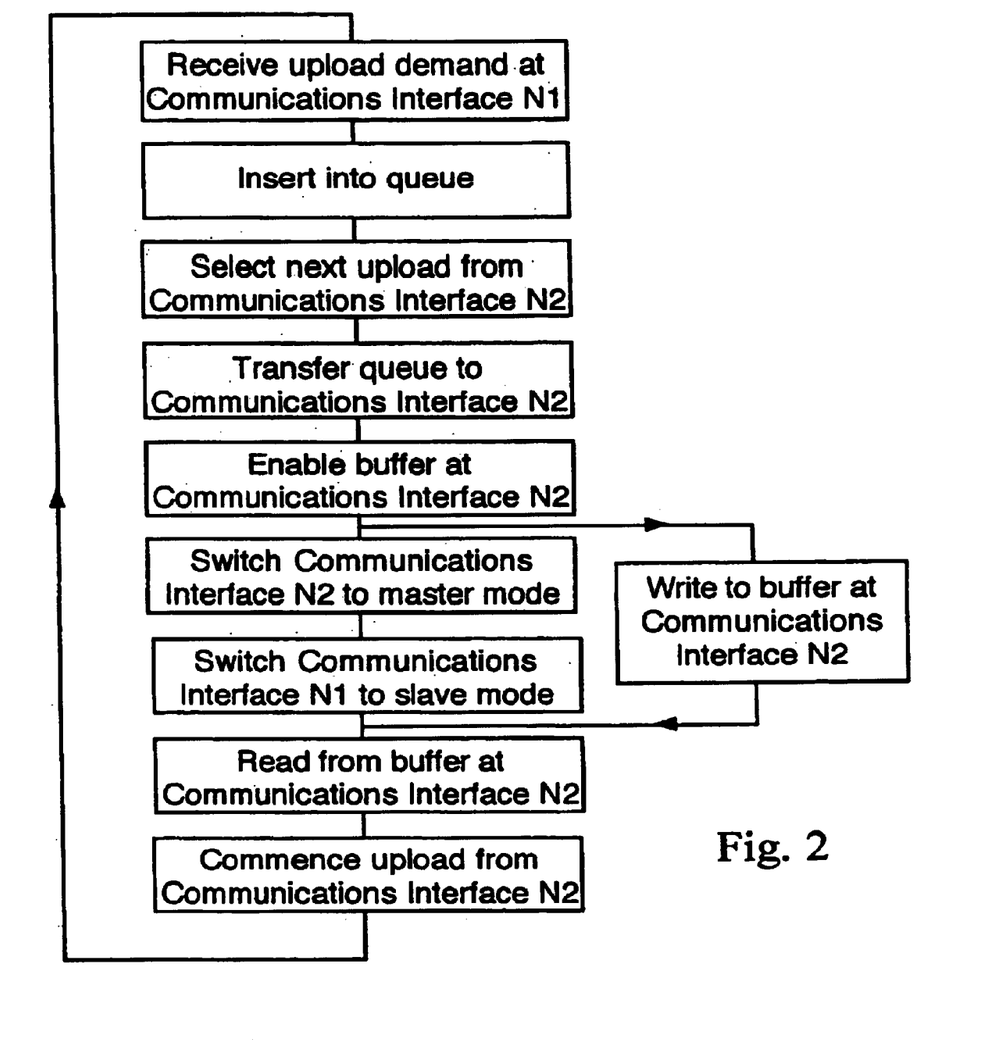
FIG. 2 is a flow diagram showing the method of time division multiplexing data uploads.

The communications interface 32, a preferred embodiment of which is illustrated in FIG. 2, is switched by the processor 34 to serve as the master communications interface M according to a demand division multiplexing technique which assigns master status to any particular communications interface 32 based on the upstream data demands, at any particular point in time, of all of the communications interfaces 32 within the local group 30.

When the communications interface 32 is serving as a master communications interface M, the processor 34 in the master communications interface M receives upload demand data from the other communications interfaces 32 in the local group 30. In the preferred embodiment the master communications interface M distinguishes between light data (or "thin") upload demands, for example up to 10 Mbs, which are relayed by the master communications interface M directly to the network; and heavy data (or "fat") upload demands, for example over 10 Mbs, which would require a direct connection between the slave communications interface S and the network in order to efficiently transfer the upload data to the network. This avoids the need to switch master status between communications interfaces 32 for every small upload demand, and thus reduces disruption of the local group due to rise time latencies inherent in the switchover process.

Communications interfaces 32 in the slave mode do not upload data to the network, but rather communicate with the master communications interface M via the supplementary communications link described below, which has a limited bandwidth. Accordingly, in the case of heavy data or 'fat' upload demands, the master communications interface M processor 34 does not receive the entire 'fat' upload from each slave communications interface S; rather, the master communications interface M processor 34 only receives a reduced-content upload comprising upload demand data, which contains sufficient data to determine which communications interface 32 is demanding the upload (for example as determined by the IP address of the interface 32 uploading the data) and the size of the demanded upload request or file. The processor 34 in the master communications interface M assigns a priority to the upload request or file based on any desired factors, which may for example include the size of the upload in comparison to other uploads demanded by other slave communications interfaces S, the interval since the slave communications interface S demanded the upload, the time since the last upload by the slave interface S, etc.

Thus, while the master communications interface M is uploading its own request or file to the DSL rack 20, the processor 34 in the master communications interface M is also building a queue of slave upload demands for 'fat' uploads, according to the logic programmed into the communications interface processors 34, and relaying to the network 'thin' slave uploads. In the preferred embodiment the processor 34 programming is configurable by the system operator, both locally and remotely (for example from a telephone company central office or node).

It may be desirable in some situations to provide one or more communications interfaces 32 which are fixed in the slave mode, for example where the only device connected to the communications interface 32 is a television set so that the only upload data that this particular communications interface 32 will need to transmit is control data for changing channels or audio/video sources. This control data is very light and can easily be relayed by the master communications interface M to the network without disrupting the 'fat' upload which is underway. Such a communications interface 32 will never need to be switched to master mode, since upload data will never exceed the light data threshold, and can accordingly, if desired, be fixed in a slave mode.

The processors 34 of the various communications interfaces 32 within the local group 30 communicate with each other via a robust supplementary communications link, preferably a conventional serial network protocol such as 10baseT Ethernet. Preferably communications interfaces 32 within the local group 30 communicate at a distinct frequency, which will not interfere with the DSL communications signal, over the same twisted pair telephone cable 27 connecting the communications interfaces 32 in a local group 30. However, the supplementary communications link can also be established by a separate cable or wireless connection dedicated to the supplementary communications link.

For example, the communications interfaces 32 in the local group 30 may each be provided with an HPNA PCI or USB interface 39, which typically transmits a QAM modulated signal at a frequency between the ADSL and VDSL bands so as not to interfere spectrally with analog or digital telephone signals. The HPNA interface establishes the supplementary communications link to effectively turn the local group 30 of communications interfaces 32 into a local area network (LAN), within the DSL communications network. The supplementary communications link can alternatively be established using any other suitable protocol with any spectrally compatible carrier (including an ac power carrier), using any desired modulation technique. Using an HPNA interface, the data transfer rate between communications interfaces can occur at up to about 10 Mbs, which is therefore advantageously set as the threshold for 'thin' uploads.

According to the invention, because of the master-slave switching capability of the processors 34 (excluding communications interfaces 32 which are dedicated to slave mode, as described above), any one communications interface 32 within the local group 30 can be enabled as the LAN 'server' at any particular time. Preferably each processor 34 is biased to the slave mode, and is switched to the master mode and latched only for the duration of the 'fat' upload to the DSL rack 20. When the master communications interface M upload is complete, the processor 34 in the master communications interface M deletes the master communications interface M upload demand from the queue; transfers the upload demand queue to the next slave communications interface S in the queue; switches the next slave communications interface S in the queue to master communications interface mode; and unlatches to switch itself back to a slave communications interface mode. The new master communications interface M thus commences uploading its data, and takes over the continual process of building the upload demand queue based on upload demand data received from the other (slave) communications interfaces 32.

As a communications interface 32 is switched to the master communications interface mode, the communications interface 32 previously serving as master communications interface M in the local group 30 is switched back to slave status, in which it is capable of receiving downloaded data from the DSL distribution rack 20 but sending data uploads, such as 'thin' uploads or upload demand data for 'fat' uploads, to the master communications interface M. The slave communications interface S cannot upload a fat upload data or file to the DSL distribution rack 20 until the communications interface 32 is switched back to master status in the manner described above, according to its position in the upload demand queue. Signal traffic between communications interfaces 32 within the local group 30 can be controlled by field programmable gate arrays (FPGAs), optionally in conjunction with relays which hold the communications interface 32 in slave mode until latched into master mode by a signal from another communications interface 32.

If the size of the file being uploaded by the master communications interface M is larger than the processor prioritizing coding will permit in one upload interval, rather than completing its upload the master-slave switching routine can interject during the download, for example removing the upload demand from the top of the queue and reinserting it (to continue where the upload was interrupted) at the end of the queue or somewhere within the queue. The master communications interface M then switches the next slave communications interface S in the queue to master communications interface mode, as described above, and the process continues. This ensures that no single communications interface 32 in the local group 30 can monopolize unacceptable intervals of upload time while other subscribers or users are trying to upload requests or files.

The communications system embodying the invention operates using a packet switching protocol, for example TCP/IP. The local group 30 preferably has a group IP address, which forms the primary header for all packets transmitted to or received by communications interfaces 32 within the local group 30, and each communications interface 32 within the local group 30 also has a unique IP address forming a secondary header, so that individual communications interfaces 32 can be recognized for routing purposes. The IP addresses may be soft-coded in each DSL modem 36, in which case a system operator can change the IP address (or restore the IP address in the event of a system failure). The IP addresses may alternatively be hard-coded into each DSL modem 36, which can facilitate digital rights management by providing a static IP address that can be embedded into data uploads to help identify rights violators. The master communications interface M holds the session IP address.

Thus, downloads from the DSL distribution rack 20 are unaffected by the demand division multiplexing of the upload signal train, and data is continually downloaded in response to user requests and routed to the appropriate destination communications interface 32. Depending upon the number of users in the local group 30, the service provider can increase the download bandwidth to accommodate the greater download demands resulting from the increased upload demand frequency; however, the upload bandwidth can remain static, user requests and file upload demands being sequenced according to a demand-driven architecture rather than sharing available upload bandwidth by frequency division. It is equally possible for the service provider to increase the upload bandwidth to accommodate greater upload demands during intervals in which download demand is low, and the processor 34 in the master communications interface M can be remotely notified, or momentarily reconfigured, from the DSL rack 20, to adjust the upload demand queue accordingly.

In operation, the communications interface 32 connected to the first user who sends a request or uploads a file, for example communications interface 32-2, is switched to become the master communications interface M as the upload demand from the user becomes the first demand in the upload demand queue in the processor 34 within the communications interface 32-2. FIG. 2 illustrates the method of time division multiplexing data uploads. When another user at communications interface 32-1 or 32-N tries to upload a 'fat' request or file, a reduced-content data upload containing upload demand data is communicated throughout the local group 30 via the supplementary communications link, and recognized as an upload demand by the master communications interface M. The programming in the processor 34 at the master communications interface 32-2 assigns a priority to the second upload demand, and inserts the second upload demand into the queue. If the second upload demand has priority over the current upload (as determined by the processor 34 programming), the master communications interface M interrupts its upload and switches to the communications interface 32 from which the second upload demand was sent. If the second upload demand does not have priority over the current upload, the master communications interface M inserts the second upload demand into the appropriate position in the upload demand queue (as determined by the processor 34 programming). This process continues for each subsequent upload demand from any communications interface 32 within the local group 30. In the case of 'thin' uploads from other communications interfaces 32, the master communications interface M merely interposes the upload data into the data stream and relays the complete upload data, received via the supplementary communications link, to the DSL rack 20 via the DSL subscriber line 26. Any current upload to the DSL rack 20 can be interrupted to insert 'thin' data uploads from slave communications interfaces S, or to switch master status to another communications interface 32 to accommodate a higher priority 'fat' upload.

Each time the master communications interface M transfers the upload demand queue to the next slave communications interface S in the queue, it also transfers the session IP address and switches the next slave communications interface S in the queue to the master communications interface mode (which becomes communications interface N1 in FIG. 2), and switches itself back to the slave communications interface mode. The new master communications interface M commences uploading its full-content upload data to the DSL rack 20, and continues process of building the upload demand queue based on upload demand data received from the other (slave) communications interfaces 32 according to the priority established by its coding. This coding can allow for considerable flexibility in the prioritization of uploads, and thus facilitates compliance by service providers with Quality of Service (QoS) standards set by industry and government regulators.

Thus, at any point in time only one of the communications interfaces 32 within a local group 30 is enabled as a master communications interface M, capable of uploading 'fat' data files to the telephone company DSL rack 20, while all other communications interfaces 32 in the local group 30 are held in slave mode and, although capable of receiving complete data downloads, send only 'thin' uploads such as channel control commands, or upload demand data associated with impending 'fat' uploads, to the master communications interface M. In this fashion a plurality of communications interfaces 32 can be connected to a single communications port 24 at the communications distribution rack 20 without increasing the upstream transmission bandwidth requirements and therefore without impinging into the available downstream bandwidth.

The rise time of the DSL signal is in the order of microseconds, so relatively little data is lost in switching master status from one communications interface 32 to another. However, in the preferred embodiment a buffer 58 is provided in each communications interface 32 to store data during master-slave switching intervals, and (if necessary) for the duration of any 'thin' upload being relayed from a slave communications interface S. As shown in FIG. 2, the processor in the master communications interface M enables the buffer 58 in the slave communications interface S that is to be switched to master status, and starts to write communications data to that buffer 58. Once the slave communications interface S has been switched to master status its processor 34 first reads the data out of the buffer 58 before reestablishing the data stream from the DSL modem 36.

Figure 3:
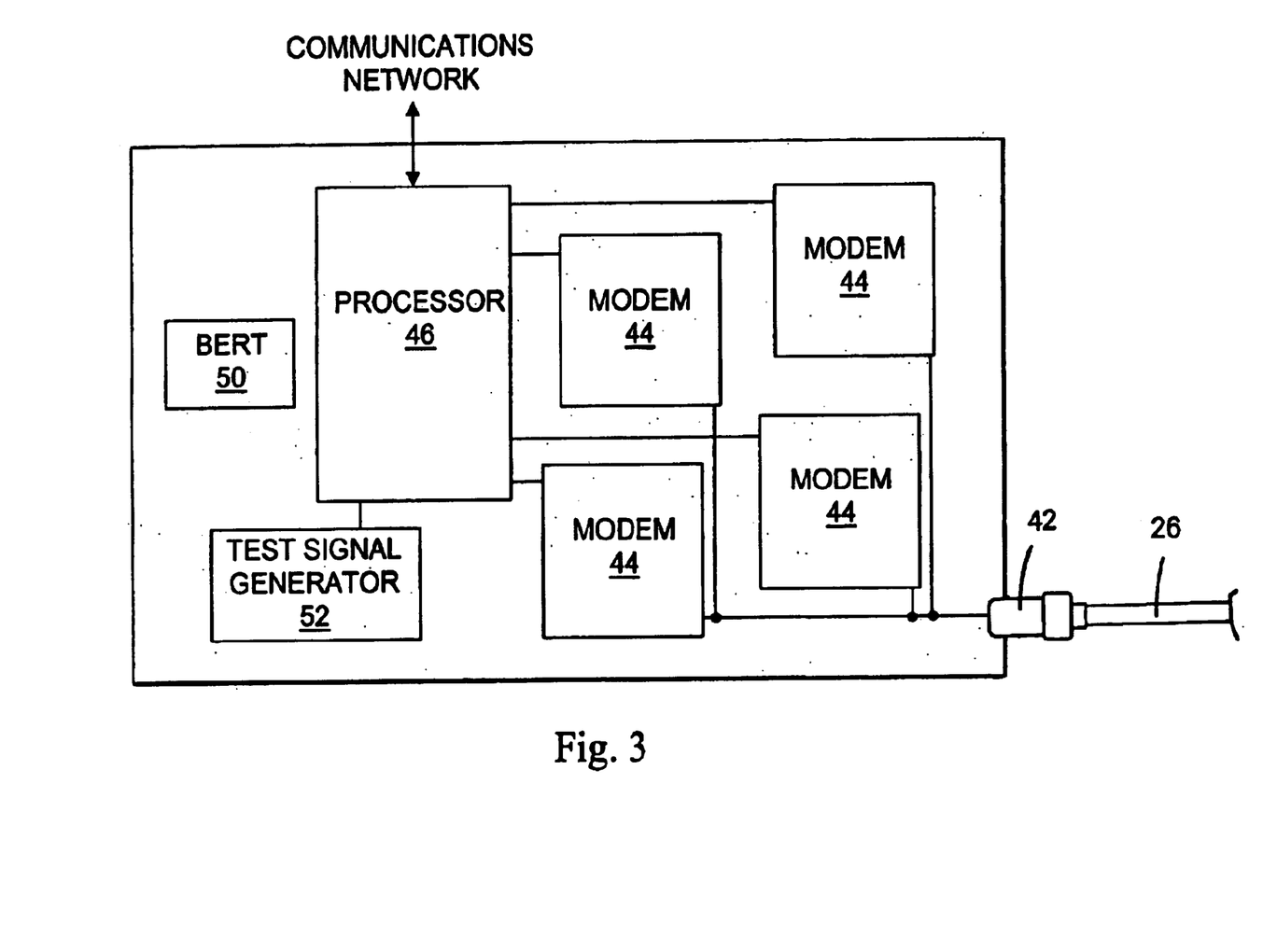
FIG. 3 is a schematic diagram of a PCI card embodying a further aspect of the invention with multiple frequency agile DSL chips dedicated to a single communications port.

FIG. 3 illustrates a compact PCI card 40, by way of example, according to a further embodiment of the invention, in which the multiple communications interfaces 32 within a local group 30 are serviced by a single data port 42 coupled to multiple DSL network modems 44. The card 40 supports four DSL network modems 44 in the embodiment shown, but this can be any practical number of DSL modems 44. In this embodiment the DSL modems 44 are preferably each frequency agile QAM (or other suitable modulation) modulator/demodulators, for processing four separate modulated carriers at different frequencies, to thus provide a multiple-channel subscriber line. Each frequency agile DSL modem 44 is adapted to transmit and receive a modulated carrier at a selected frequency, which may be selected as described below, and which is sufficiently separated from the frequencies of the other DSL modems 44 to avoid interference.

Suitable guardband filters may be integrated with the modems 44, allowing maximization of the bandwidth of each channel while avoiding interference between adjacent channels. Where the modems 44 are frequency agile, the guardband filters are also frequency agile and are dynamically set to correspond to the upper and lower frequency limits of each respective channel to preserve the frequency separation between carriers.

Thus, the subscribers in the local group 30 have a much greater bandwidth available (in theory, the number of DSL modems 44 servicing the port 42 times the bandwidth of each individual DSL modem 44). This significantly increases both downstream and upstream bandwidths of the composite DSL signal to and from the connected communications interfaces 32 at the subscribers' premises in the local group 30.

The multiple-DSL modem embodiment of FIG. 3 can be implemented using any available card format and/or form factor, and can be provided with any suitable number of DSL modems 44 modulating the DSL signal using any suitable technique. The DSL modems 44 may have fixed frequencies sufficiently separated from the frequencies of the other DSL modems 44 servicing the same port 42 to avoid interference, or a combination of fixed-frequency and frequency agile modems 44 may be used.

Where frequency agile modems 44 are used, the subscriber DSL modem 36 in each communications interface 32 is also frequency-agile, and the processor 34 is programmed to set the frequency of the DSL subscriber modem 36 to correspond to the frequency of the DSL network modem 44 serving the local group 30. Immediately before any change in transmission frequency the DSL modem 44 transmits data to the local group 30, tasking the processors 34 in the communications interfaces 32 to adjust the DSL subscriber modems 36 to the new frequency. In the preferred embodiment a microprocessor 46, for example (but not limited to) a digital signal processor (DSP), is either integrated into the PCI card 40 or coupled through contacts on the PCI card 40 to pins controlling the carrier frequency of each DSL network modem 44. The allocation of frequencies as between the frequency agile DSL network modems 44 may be controlled dynamically by the microprocessor 46 based on any number of desired factors, including dynamic factors such as signal sharing with other subscribers' signals; the data density of each subscriber's signal at any particular point in time; and interference from other sources; as well as static factors such as: attenuation due to frequency band, cable length, cable type, cable idiosyncrasies, and/or impedance; and signal-to-noise ratio. The microprocessor 46 may be programmed to take into account any other factors, in each case controlled by suitable detection means (not shown) which analyzes momentary conditions of the subscriber line and transmits data to the microprocessor 46 for processing. The multiple factors may be weighted and processed based on any desired logic, including fuzzy logic, programmed into the microprocessor 46, to select for each DSL network modem 44 the optimum frequency band for the modulated carrier at any particular point in time.

In the preferred embodiment the allocation of frequencies as between frequency agile DSL network modems 44 is controlled dynamically by the microprocessor 46 in response to the bit error rate (BER) of the DSL communications signal. A bit error rate tester (BERT) 50 is disposed at the user site, for example integrated into the communications interface 32, and a test signal generator 52 is disposed at the telephone company central office, for example integrated into the PCI card 40 in the DSL rack 20. The test signal generator 52 at the DSL rack 20 sends a digital test signal sweep, and the bit error rate of the test signals at various frequencies is detected by the BERT 50 at the communications interface 32 which returns a value corresponding to an optimal frequency (i.e. lowest BER) for the downstream signal between the DSL rack 20 and the subscriber. The microprocessor 46 receives the transmitted value and sets one of the DSL network modems 44 to the optimal frequency corresponding thereto. The test sweep can be spectrally comprehensive, or can be restricted to one or more specific bands as desired.

A BERT 50 can also be disposed at the telephone company central office, for example integrated into the DSL rack 20, and a test signal generator 52 can be disposed at the subscriber site, for example integrated into the communications interface 32, to test sweep the upstream signal from the subscriber to the DSL rack 20 in the same fashion. In this case the BERT communicates the optimal frequency value directly to the processor 24 to reset the frequency of the DSL network modem 44 (and consequently the DSL subscriber modem 36) accordingly.

Figure 4:
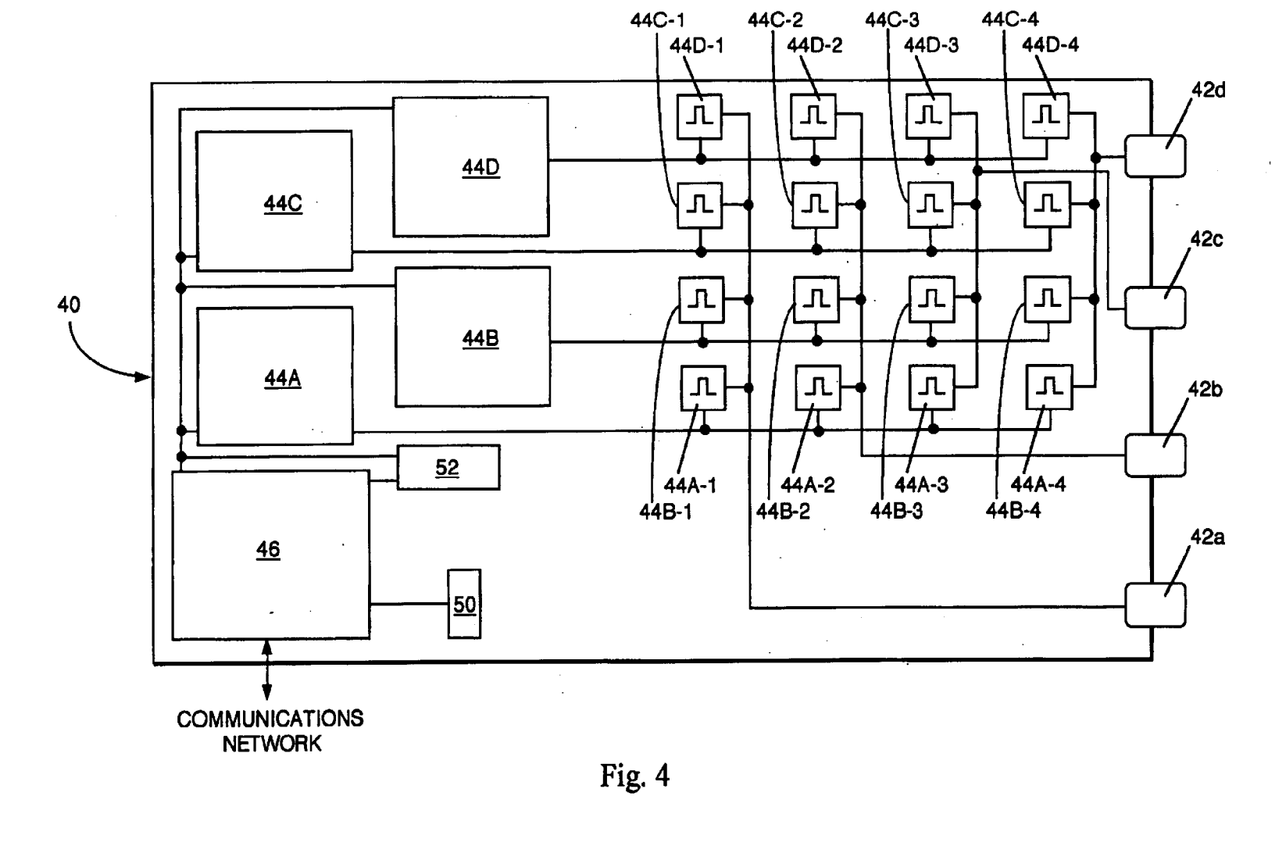
FIG. 4 is a schematic diagram of a PCI card providing multiple frequency agile DSL chips for switching between multiple ports.

If desired the DSL modems 44 can be circuit switched to N additional lines to increase the port density of the card 40. For example, FIG. 4 illustrates an embodiment of the invention comprising a wide area network (WAN) interface concentrator, in which four DSL chips 44 serve four data ports 42, one at a time, with the ability to cross-switch between ports to maximize spectral efficiency.

The routing device may comprise physical routing switches, for example a cross-point matrix switcher or a series of relays (not shown). In the preferred embodiment illustrated each DSL modem 44 is connected to a port 42 by a routing device comprising a series of frequency-agile notch filters 48, each having a variable passband controlled by the microprocessor 46. To connect a particular DSL modem 44 to a particular port 42, the notch filter 48 coupled to the desired port 42 is set to a passband corresponding to the frequency of the desired DSL modem 44 and the remaining notch filters 48 coupled to that same port 42 are set so that the frequency of the desired DSL modem 44 falls within a stopband of the notch filters 48.

Thus, for example, to couple DSL modem 44A to port 42d, notch filter 48A-4 is adjusted to pass the frequency $f_a$ to which DSL modem 44A is set, and the other notch filters 48A-1, 48A-2 and 48A-3 have their passbands set so that the frequency $f_a$ falls within a stopband of the notch filters 48A-1, 48A-2 and 48A-3, effectively blocking the frequency $f_a$ from ports 42a, 42b and 42c; notch filters 48B-2, 48C-4 and 48D-3 can at the same time be respectively set to pass frequencies $f_b$, $f_c$ and $f_d$ of DSL modems 44B, 44C and 44D respectively to ports 42b, 42d and 42c, all remaining (unused) notch filters 48 being set so that the frequencies $f_b$, $f_c$ and $f_d$ fall within their stopbands. It will be apparent that the various combinations and permutations available from this configuration allow each DSL modem 44A, 44B, 44C, 44D to be connected to any one (or more) of the ports 42a, 42b, 42c, 42d serviced by the card 40, or by multiple cards 40 which may for example be connected through the backplane of the DSL rack 20. This configuration also allows service providers to dynamically assign increased or decreased data rates to different ports 42 as upload and download demands may dictate at any particular time.

While the communications interfaces 32 within a local group 30 are advantageously disposed in different rooms within a single subscriber's premises, it is also possible to provide a plurality of communications interfaces 32 distributed within multiple subscribers' premises (for example neighbouring homes, neighbouring units in a commercial complex, neighbouring suites in a multiple-unit residential or commercial building etc.). This can be accomplished by bridging separate subscriber lines through a spectrally differential bridging structure.

For example, the bridged data distribution network described in copending U.S. patent application Ser. No. 09/702,759 to Jeffery filed Nov. 1, 2000, which is incorporated herein by reference, couples the subscribers' lines at frequencies above the analog band. The coupling is invisible to subscribers, because low frequency analog signals are blocked by the bridging filters and thus remain isolated to each respective subscriber line. However, communications at the coupled frequencies are packet-switched, so despite that all coupled frequencies are available to all bridged subscriber lines, each subscriber receives only packets intended for that subscriber. Such an arrangement could be located in the service suite of a multi-unit structure, in a pedestal located in the vicinity of a group of premises, or in any other convenient location.

Figure 5:
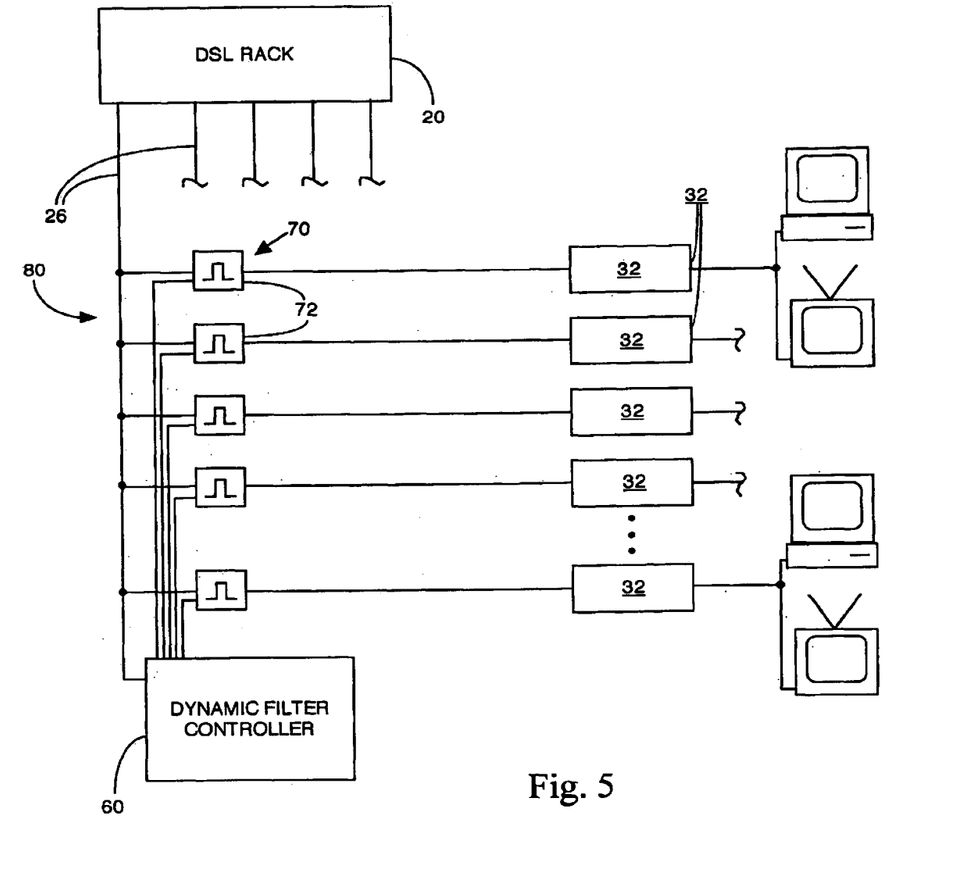
FIG. 5 is a schematic diagram illustrating a filter bridge for routing selected carriers within a multi-channel signal to selected subscribers in the multipoint DSL system of FIG. 1.

A parallel filter bridge 70 for use with communications interface 32 of the invention, illustrated in FIG. 5, is particularly useful in the multi-channel embodiment of the invention, where separate services are desired to be provided to the different communications interfaces 32 on the subscriber line 26. In the embodiment of FIG. 5 the parallel bandpass filter bridge 70 comprises a series of filter blocks 72 adapted to selectively pass one or more channels of the multi-channel transmission, for example a multi-channel DSL signal, transmitted between one port 24 of the DSL rack 20 and the various communications interfaces 32 over the single subscriber telephone line 26, and also low frequency POTS (plain old telephone service) signals if desired. FIG. 5 illustrates the connection for a single subscriber line 26, it being understood that each subscriber line 12 serviced by the DSL rack 20 (or other communications distribution equipment) can be connected in the same manner.

In the embodiment of FIG. 5 a plurality of communications interfaces 32 are connected in parallel to the subscriber line 26, for example communications interfaces 32 located in different subscribers' premises or in different rooms within a single subscriber's premises sharing the same telephone line 26. The DSL port 24 is coupled through the subscriber line 26 to each communications interface 32 through a separate filter block 72, preferably comprising a plurality of high pass and/or notch filters which can be independently activated to pass only those frequencies which each respective communications interface 32 is authorized or intended to receive, and if desired a low pass filter which passes low frequency POTS signals for normal use of the telephone 2. Each filter block 72 thus passes and blocks selected channels of the multi-channel DSL signal from the DSL rack 20, and passes or blocks a POTS signal.

The parallel filter bridge 70 of FIG. 5 is capable of coupling all or some communications interfaces 32 on the subscriber line 26 at specified frequencies. Any number of selected communications interfaces 32 on the subscriber line 26 may thus be coupled at one or more specified frequencies corresponding to one or more channels of the redistribution signal and/or the POTS signal. In effect, the parallel filter bridge 70 can be used to parse a subscriber line 26 into a plurality of isolated telephone lines, up to the number of channels in the multi-channel signal, each string of communications interfaces 32 being isolated from the others by selective blocking of channels at the filter blocks 72. The filter bridge 70 of FIG. 5 can also be used to selectively pass and block upstream communications channels for each separate communications interface 32, to thus allow simultaneous upstream data requests and uploads by different communications interfaces 32 in the same subscriber line 26. The dynamic filter controller 60, which allocates frequencies to the filter blocks 72, can be controlled by signals sent from the DSL rack 20 or locally.

Figure 6:
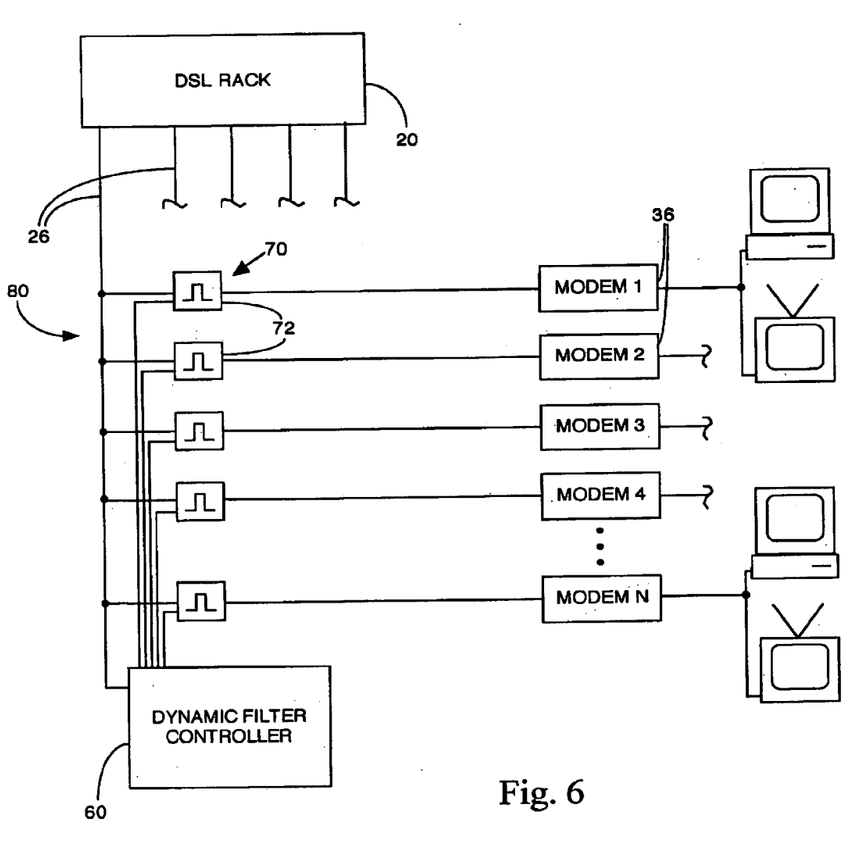
FIG. 6 is a schematic diagram of the filter bridge of FIG. 5 in use with a plurality of conventional DSL subscriber modems.

The filter bridge 70 also has applications outside of the communications interfaces of the invention. An embodiment of the filter bridge 70 implemented in a DSL subscriber network having a string of conventional DSL modems 36 connected to a single, multi-channel subscriber line 26 is illustrated in FIG. 6. This network is not constrained to rely entirely on packet switching in order to route selected services to the appropriate subscriber modem 36, and allows simultaneous uploads from different modems 36 on different channels.

Figure 7:
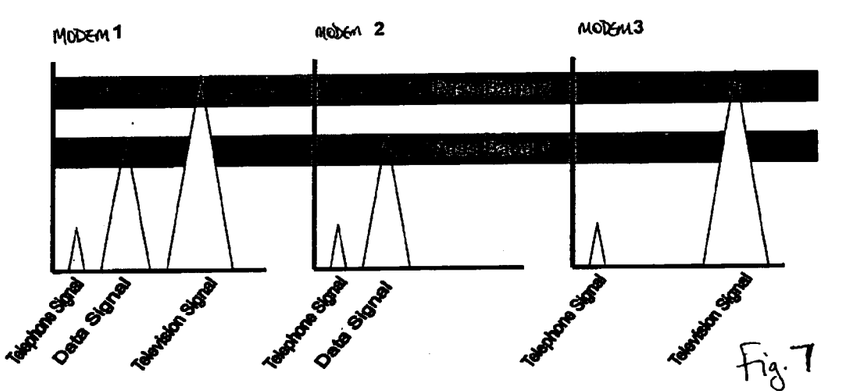
FIG. 7 is a graph showing an example of selective channel routing to modems on a single subscriber line using the filter bridge of FIG. 6.

Thus, in the example shown in FIG. 7, MODEM 1 has selected a high definition television program, MODEM 2 is browsing the Internet and MODEM 3 has selected a pay-per-view movie. The filter block 72 passing carriers to MODEM 2 is set to pass a mid-range frequency data signal to MODEM 2 (shown as Pass Band 1 in FIG. 4) for browsing, while the filter blocks 72 passing carriers to MODEM 1 and MODEM 3 are set to pass a high frequency video signal to MODEM 1 and MODEM 3 (shown as Pass Band 2 in FIG. 4). The separate signals contained in the high frequency carrier to MODEM 1 and MODEM 3 are distinguished by data packet headers with an address unique to the requesting modem, so MODEM 1 and MODEM 3 each processes only data packets having the required header. All three filter blocks 72 have low pass filters, to pass low frequency POTS signals to all three modems 36 and thus preserve normal telephone operation within the premises.

In these embodiments the filter blocks 72 may comprise any combination of fixed-frequency and/or frequency agile filters, and the frequency agile filters can be dynamically controlled by the dynamic filter controller 60 responsive to signals from the DSL rack 20, to allocate a channel most suitable for the signal intended for each modem 36. Suitable guardband filters may be integrated into the filter blocks 72, allowing maximization of the bandwidth of each channel while avoiding interference between adjacent channels. Where the filters are frequency agile, the guardband filters are also frequency agile and are dynamically set to correspond to the upper and lower frequency limits of each respective channel in order to preserve the frequency separation between carriers.

For use in a subscriber line 26 serving multiple subscribers, the filter blocks 72 may be disposed at any convenient distribution point, for example a telephone room in a multi-dwelling unit or commercial structure, or at any local junction serving a residential neighborhood, etc. To serve multiple communications interfaces 32 or modems 36 within a single subscriber premises (i.e. sharing a telephone line), the filter blocks 70 may be implemented at the telephone line junction box within the subscriber's premises, or may be contained in the wallplate serving (or containing) the communications interface 32 or subscriber modem 36, activated by signals from the DSL rack 20 to the dynamic filter controller 60 to selectively set the passband and stopband frequencies for each particular communications interface 32 or subscriber modem 36.

As noted above, the invention may be implemented in any diplex communications system, including dynamic communications systems, and provides data management which allows for point-to-multipoint communications in a wide area network. A preferred embodiment of the invention has been described by way of non-limiting example only, and those skilled in the art will appreciate that certain modifications and adaptations may be made without departing from the scope of the invention as claimed.

We claim:

1. For a diplex communications network exchanging data packets with a plurality of subscriber stations, a communications interface for the subscriber stations comprising:
   a communications port for connection to the network,
   a modem having an address, coupled to the communications port,
   a processor coupled to the modem, for processing data packets having identifier information relating the data packets to the address, the processor further comprising
      a master communications interface mode in which the communications interface serves as a master communications interface for downloading data packets from the network and uploading data packets to the network, and
      a slave communications interface mode in which the communications interface serves as a slave communications interface for downloading data packets from the network and uploading data packets to the master communications interface,
      the communications interfaces switching between master mode and slave mode responsive to a priority queue of upload demands from the plurality of communications interfaces, and
   a supplementary communications link, for communicating with one or more other communications interfaces,
   wherein when a plurality of communications interfaces are connected in parallel one of the plurality of communications interfaces is in master mode and the others of the plurality of communications interfaces are in slave mode.

2. The communications interface of claim 1 comprising a buffer for storing data during switching intervals.

3. The communications interface of claim 1 wherein the supplementary communications link comprises twisted pair telephone wiring within a premises.

4. The communications interface of claim 1 wherein the communications interface remains in master mode to relay to the network an upload demand from another communications interface which is below a threshold size or data rate.

5. The communications interface of claim 1 wherein the processor is remotely configurable.

6. The communications interface of claim 1 wherein the supplementary communications link communicates using Ethernet.

7. The communications interface of claim 6 wherein the supplementary communications link comprises a Home Phone Networking Alliance (HPNA) card.

8. The communications interface of claim 5 wherein the modem is frequency agile.

9. The communications interface of claim 1 wherein one or more of the others of the plurality of communications interfaces are fixed in slave mode.

10. The communications interface of claim 1 wherein when switching from master mode to slave mode the priority queue is transferred from the communications interface to another communications interface.

11. A diplex communications network exchanging data packets with a plurality of subscriber stations, comprising
  a plurality of communications interfaces for the subscriber stations, at least some of the communications interfaces comprising:
    a communications port for connection to the network,
    a modem having an address, coupled to the communications port,
    a processor coupled to the modem, for processing data packets having identifier information relating the data packets to the address, the processor further comprising
      a master communications interface mode in which the communications interface serves as a master communications interface for downloading data packets from the network and uploading data packets to the network, and
      a slave communications interface mode in which the communications interface serves as a slave communications interface for downloading data packets from the network and uploading data packets to the master communications interface,
    the communications interfaces switching between master mode and slave mode responsive to a priority queue of upload demands from the plurality of communications interfaces, and
  a supplementary communications link, for communicating with one or more other communications interfaces,
  wherein when a plurality of communications interfaces are connected in parallel one of the plurality of communications interfaces is in master mode and the others of the plurality of communications interfaces are in slave mode.

12. The communications network of claim 11 comprising a buffer for storing data during switching intervals.

13. The communications network of claim 11 wherein the supplementary communications link comprises twisted pair telephone wiring within a premises.

14. The communications network of claim 11 wherein a communications interface in master mode remains in master mode to relay to the network an upload demand from another communications interface which is below a threshold size or data rate.

15. The communications network of claim 11 wherein the processor is remotely configurable.

16. The communications network of claim 11 wherein the supplementary communications link communicates using Ethernet.

17. The communications network of claim 16 wherein the supplementary communications link comprises an HPNA card.

18. The communications interface of claim 15 wherein the modem is frequency agile.

19. The communications network of claim 11 wherein one or more of the others of the plurality of communications interfaces are fixed in slave mode.

20. The communications network of claim 11 wherein when switching from master mode to slave mode the priority queue is transferred from one communications interface to another communications interface.

21. A method of communicating over a diplex communications network exchanging data packets over a subscriber line with communications interfaces at a plurality of subscriber stations, comprising the steps of:
  a. for each communications interface, assigning an address to a modem coupled to a communications port of each communications interface,
  b. routing to each respective communications interface data packets downloaded from the network having identifier information relating the data packets to the address,
  c. in a master communications interface mode, uploading data packets to the network over the subscriber line,
  d. in a slave communications interface mode, uploading data packets to a master communications interface over a supplementary communications link, and
  e. switching the communications interfaces between master mode and slave mode responsive to a priority queue of upload demands from the plurality of communications interfaces,
    wherein when a plurality of communications interfaces are connected in parallel one of the plurality of communications interfaces is in master mode and the others of the plurality of communications interfaces are in slave mode.

22. The method of claim 21 comprising the step of storing upload data during switching intervals.

23. The method of claim 21 wherein the supplementary communications link comprises twisted pair telephone wiring within a premises.

24. The method of claim 21 wherein a communications interface in master mode remains in master mode to relay to the network an upload demand from another communications interface which is below a threshold size or data rate.

25. The method of claim 21 including the step of remotely configuring one or more communications interfaces.

26. The method of claim 21 wherein the supplementary communications link communicates using Ethernet.

27. The method of claim 26 wherein the supplementary communications link comprises an HPNA card.

28. The method of claim 25 wherein the modem is frequency agile, and including the step of changing a frequency of the modem responsive to subscriber line conditions.

29. The method of claim 21 wherein one or more of the others of the plurality of communications interfaces are fixed in slave mode.

30. The method of claim 21 including the sub-step, when switching from master mode to slave mode, of transferring the priority queue from one communications interface to another communications interface.

* * * * *